US007944700B2

(12) United States Patent
Wang et al.

(10) Patent No.: US 7,944,700 B2
(45) Date of Patent: May 17, 2011

(54) CASE OF SERVER

(75) Inventors: Shi-Feng Wang, Shanghai (CN);
Ji-Peng Xu, Shanghai (CN); Tsai-Kuei Cheng, Taipei (TW)

(73) Assignee: Inventec Corporation, Taipei City (TW)

( * ) Notice: Subject to any disclaimer, the term of this patent is extended or adjusted under 35 U.S.C. 154(b) by 165 days.

(21) Appl. No.: 12/488,235

(22) Filed: Jun. 19, 2009

(65) Prior Publication Data

US 2010/0265645 A1 Oct. 21, 2010

(30) Foreign Application Priority Data

Apr. 17, 2009 (TW) ................................ 98112810 A

(51) Int. Cl.
*H05K 7/16* (2006.01)
*H05K 1/14* (2006.01)
(52) U.S. Cl. ........................................ 361/727; 361/736
(58) Field of Classification Search ............. 361/679.01, 361/679.02, 724–731, 736
See application file for complete search history.

(56) References Cited

U.S. PATENT DOCUMENTS

| | | | | |
|---|---|---|---|---|
| 5,412,534 A * | 5/1995 | Cutts et al. | ..................... | 361/695 |
| 5,751,549 A * | 5/1998 | Eberhardt et al. | ....... | 361/679.33 |
| 6,650,535 B1 * | 11/2003 | Moss et al. | ............... | 361/679.33 |
| 6,771,499 B2 * | 8/2004 | Crippen et al. | .......... | 361/679.48 |
| 6,795,314 B1 * | 9/2004 | Arbogast et al. | .............. | 361/695 |
| 7,099,160 B1 * | 8/2006 | Ice | ................. | 361/802 |
| 7,394,660 B2 * | 7/2008 | Hidaka | ......... | 361/727 |
| 7,400,510 B1 * | 7/2008 | Milligan et al. | ............. | 361/752 |
| 2004/0062002 A1 * | 4/2004 | Barringer et al. | ............ | 361/687 |
| 2005/0135069 A1 * | 6/2005 | King et al. | ..................... | 361/727 |
| 2006/0044775 A1 * | 3/2006 | Hoshino et al. | ............... | 361/796 |
| 2006/0050487 A1 * | 3/2006 | Wu et al. | ....................... | 361/724 |
| 2006/0221579 A1 * | 10/2006 | Liang et al. | .................... | 361/724 |
| 2007/0025095 A1 * | 2/2007 | Beall et al. | .................... | 361/796 |
| 2007/0223200 A1 * | 9/2007 | Fujiya et al. | ................... | 361/727 |
| 2007/0230111 A1 * | 10/2007 | Starr et al. | ..................... | 361/685 |
| 2008/0037209 A1 * | 2/2008 | Niazi et al. | .................... | 361/683 |
| 2009/0002934 A1 * | 1/2009 | Carlson et al. | ................. | 361/684 |
| 2009/0097200 A1 * | 4/2009 | Sharma et al. | ................ | 361/688 |
| 2009/0257187 A1 * | 10/2009 | Mills et al. | ............... | 361/679.33 |

FOREIGN PATENT DOCUMENTS

WO   WO 2007112109 A2 * 10/2007

* cited by examiner

*Primary Examiner* — Jayprakash N Gandhi
*Assistant Examiner* — Adrian S Wilson
(74) *Attorney, Agent, or Firm* — J.C. Patents

(57) ABSTRACT

A case of server includes a chassis, a first top cover, a second top cover, at least a first tray, at least a second tray, an input/output interface circuit board, a mother board, and a third top cover. The first and the second top covers are fixed at two sides of the chassis, where an opening is formed therebetween. The first and the second trays are slidingly disposed at the chassis. The first and the second trays are correspondingly under the second top cover and the first top cover respectively. The input/output circuit boards are disposed on the first trays and the mother boards are disposed on the second trays. The third top cover is located between the first and the second top covers for covering the opening. When the third top cover is detached from the chassis, the electronic components disposed therein can be taken out from the opening.

18 Claims, 9 Drawing Sheets

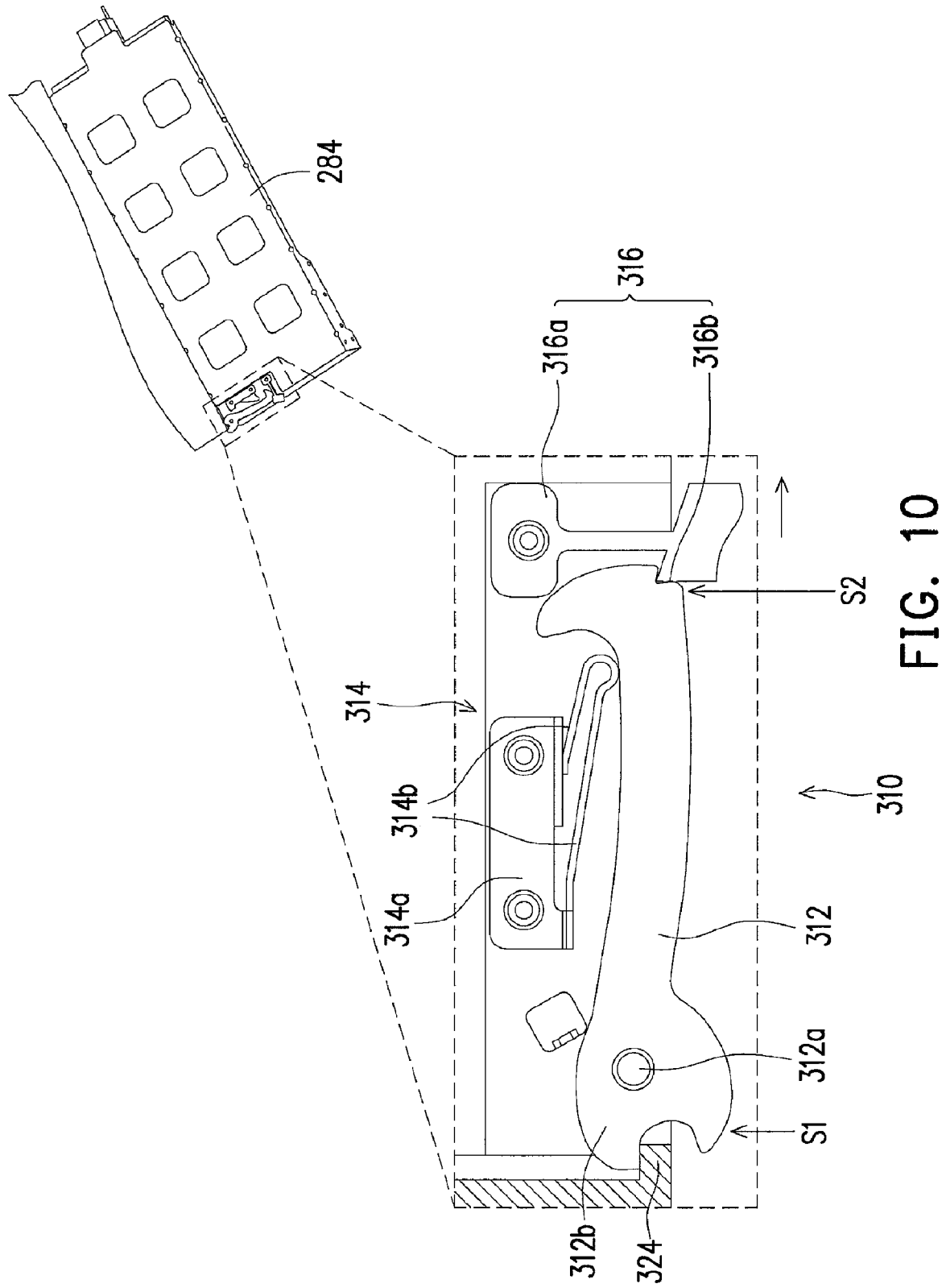

CASE OF SERVER

CROSS-REFERENCE TO RELATED APPLICATION

This application claims the priority benefit of Taiwan application serial no. 98112810, filed Apr. 17, 2009. The entirety of the above-mentioned patent application is hereby incorporated by reference herein and made a part of specification.

BACKGROUND OF THE INVENTION

1. Field of the Invention

The present invention generally relates to a case of server, and more particularly, to an easily-detached case of server.

2. Description of Related Art

A server has been broadly used in various enterprises today. In association with the applications in Internet and telecommunication fields, the servers are also penetrated into our daily lives, such as banking, financial business, Internet bank and Internet credit card transaction. All of the above-mentioned applications require the data to be highly encrypted to prevent decoding, which are accomplished by means of enhanced operation capability of the servers only. A server is in charge of providing various processed information in LAN (local area network), Internet or other networks, so that the other terminals linking the server through a network can quickly obtain the required data or results and output the data or results to the users demanding them.

FIG. 1 is a system architecture diagram of a conventional server. Referring to FIG. 1, a conventional server 100 includes a mother board 110, a hard disk drive bracket (HDD bracket) 120, a plurality of fans 130 and a plurality of connectors 140. A plurality of HDDs (not shown) are disposed in the HDD bracket 120, the connectors 140 are disposed on the mother board 110, and the connectors 140 can be, for example, power control connector, serial advanced technology attachment (SATA) connector, integrated development environment (IDE) connector, floppy disk drive connector and universal serial bus (USB) connector. The fans 130 are used to dissipate heat of the conventional server 100.

SUMMARY OF THE INVENTION

Accordingly, the present invention is directed to a case of server, which is advantageous in easily disassembling the case to make maintenance and replace the electronic components in the case conveniently.

The present invention provides a case of server, which includes a chassis, a first top cover, a second top cover, at least a first tray, at least a second tray, at least an input/output interface circuit board, at least a mother board, a third top cover and a fixing portion. The chassis has a front side, a back side and a bottom plate, wherein the bottom plate has a fixing portion, and the first top cover and the second top cover are fixed on the chassis. The above-mentioned first top cover and the second top cover are respectively located at the front side and the back side of the chassis, and an opening is disposed between the first top cover and the second top cover. The first trays and the second trays are slidingly disposed at the chassis, wherein when the first trays and the second trays are located in the chassis, the first trays are correspondingly located under the second top cover and the second trays are correspondingly located under the first top cover. The input/output circuit boards are disposed on the first trays and the mother boards are disposed on the second trays correspondingly. The third top cover is located between the first top cover and the second top cover for covering the opening, wherein the third top cover is detachedly assembled with the chassis. The fixing portion is disposed at the bottom plate of the chassis, and when the third top cover is disassembled from the chassis, the fixing portion is exposed by the opening.

In an embodiment of the case of server of the present invention, the case of server further includes a power-supporting frame fixed on the bottom plate of the chassis and correspondingly located under the second top cover, wherein the power-supporting frame forms an accommodating space for placing a power supply.

In an embodiment of the case of server of the present invention, the case of server further includes a plurality of central partition plates disposed in the chassis, wherein many of the central partition plates are for separating the first trays from each other, rest of the central partition plates are disposed between the second trays and the power-supporting frame, and each of the central partition plates has a plurality of sliding rails thereby the first trays and the second trays are slidingly disposed in the chassis.

In an embodiment of the case of server of the present invention, the above-mentioned third top cover has a plurality of locking elements correspondingly locked with a plurality of positioning holes of the chassis. In addition, the two adjacent side edges of the first top cover and the second top cover respectively have a first carrying folding and a second carrying folding, and the positioning holes are respectively formed on the first carrying folding and the second carrying folding. The locking elements are I-shaped and the positioning holes are calabash-figured holes.

In an embodiment of the case of server of the present invention, the case of server further includes a spring strip having two ends, wherein one end of the spring strip is fixed at the lower surface of the third top cover, and another end is elastically moveable. The spring strip has at least a locking tab, when the locking elements of the third top cover lock the positioning holes, the locking tab of the spring strip suits to lock a locking hole of the chassis to make the third top cover fixed on the chassis. The spring strip further has a pressing portion protruded out of a positioning portion of the third top cover, and a force is exerted to the pressing portion so as to release the position-limiting of the third top cover from the chassis.

In an embodiment of the case of server of the present invention, the case of server further includes at least a hard disk drive bracket carried by the second trays and fixed on the mother boards to accommodate at least an HDD.

In an embodiment of the case of server of the present invention, each of the first trays further has a plurality of supporting portions opposite to each other for accommodating at least a fan unit so that each of the fan units i spans and fixed between any two supporting portions opposite to each other. Besides, the supporting portions respectively have a plurality of locking slots, each of the fan units has a fan chassis and a plurality of fan vibration resisting elements connecting the fan chassis, the fan vibration resisting elements are fixed at the lower side wall of the fan chassis and respectively lock the corresponding locking slots.

In an embodiment of the case of server of the present invention, the case of server further includes a plurality of locking structures suitable to be disposed at a surface of the first tray and the second tray, wherein the locking structures are respectively disposed at two sides of the first tray and the second tray away from each other. The chassis has a positioning portion, and the each of locking structure includes a handgrip, an elastic element and a retaining element. The handgrip is pivoted on the surface of the first tray or the second tray. The elastic element is connected to and fixed at the first tray or the second tray and urged against the handgrip. The retaining element is connected to and fixed at the first tray or the second tray, and when the retaining element is locked the handgrip, the handgrip is located at an initial position; when the retaining element and the handgrip are free from interference, an elastic force of the elastic element is exerted on the handgrip so as to move the handgrip away from the initial position; when the handgrip away from the initial position urges the elastic element, the retaining element thereby locks the handgrip to fix the handgrip at the initial position. The handgrip has a pivoting shaft, a positioning element, a first end and a second end opposite to the first end. The pivoting shaft is located at the first end and suitable to connect the first tray or the second tray, so that the handgrip is suitable to swing on the surface by means of the pivoting shaft. The positioning element is disposed at the first end and suitable to interfere with the positioning portion so as to fix the first tray or the second tray at the chassis. In addition, the elastic element has a first fixing portion and a leaning portion, the first fixing portion is connected to and fixed at the first tray or the second tray, and the leaning portion is connected to the first fixing portion and pushed by the handgrip. The retaining element has a second fixing portion and a retaining portion, the second fixing portion is connected to and fixed at the first tray or the second tray, and the retaining portion is connected to the second fixing portion and locks the second end of the handgrip.

In an embodiment of the case of server of the present invention, a side of the first tray far away from the second tray has a first bending portion, a side of the second tray far away from the first tray has a second bending portion, and the first bending portion and the second bending portion respectively form a rear window and a front window of the chassis.

Based on the description above, in the case of server of the present invention, the third top cover can be detached from the chassis, therefore the user can conveniently maintain or replace the electronic components in the case of server. Besides, by disposing the sliding rails in association with the carrying trays, the electronic components in the case of server are hot-swappable conveniently for the user.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIG. 10 is a diagram of the locking structures in the case of server, wherein the locking structures are installed at the bottom portion of the first tray in the case of server.

DESCRIPTION OF THE EMBODIMENTS

Figure 1:
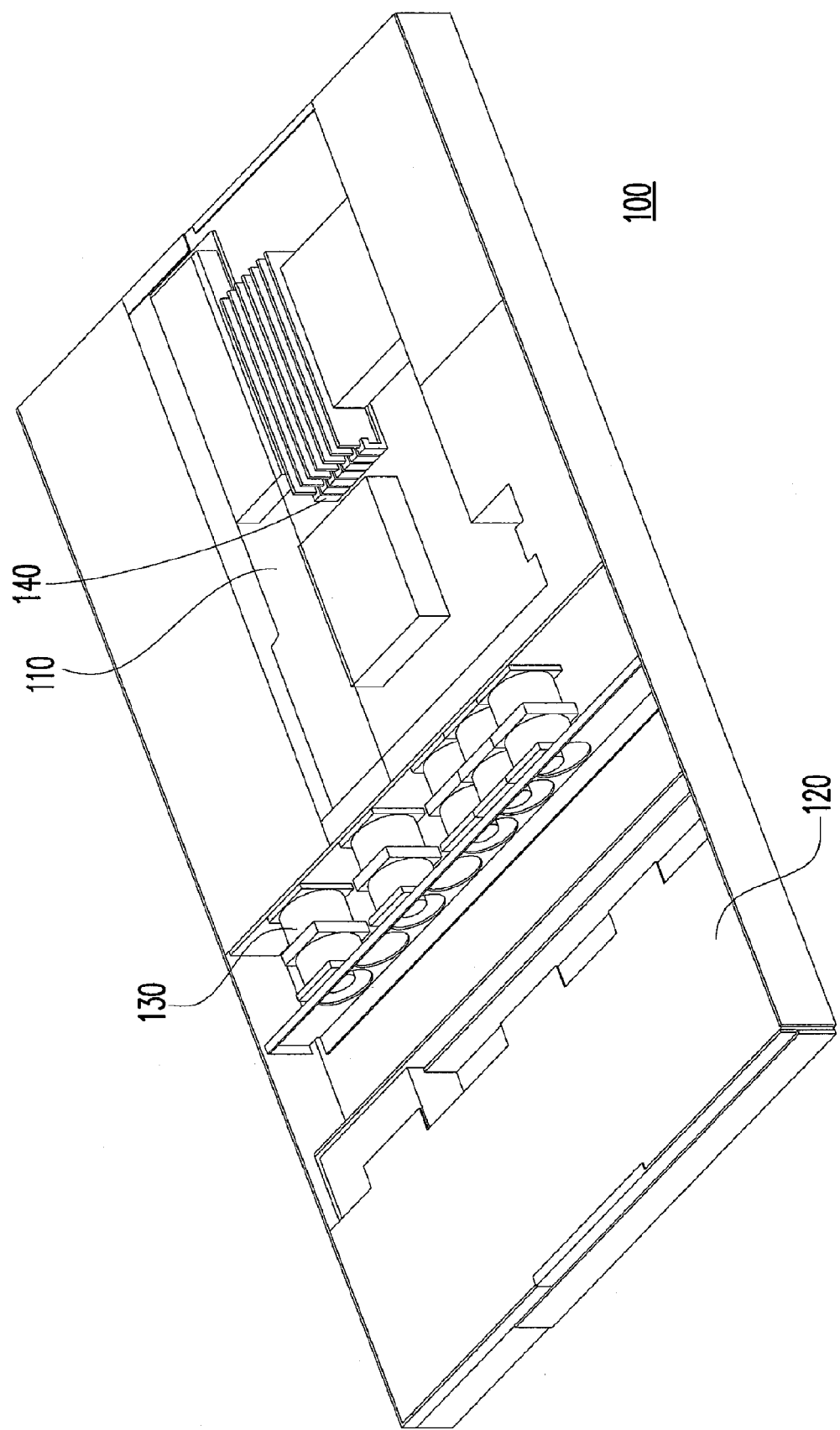
FIG. 1 is a system architecture diagram of a conventional server.

Reference will now be made in detail to the present preferred embodiments of the invention, examples of which are illustrated in the accompanying drawings. Wherever possible, the same reference numbers are used in the drawings and the description to refer to the same or like parts.

Figure 2:
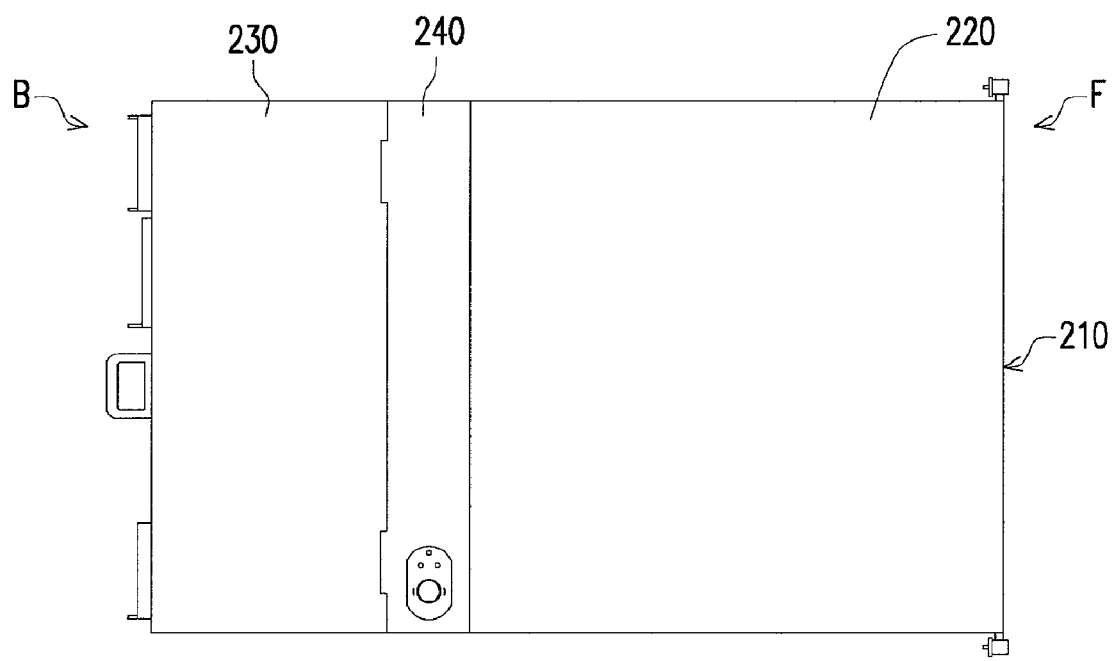
FIG. 2 is a top-view diagram of a case of server according to an embodiment of the present invention.
Figure 3:
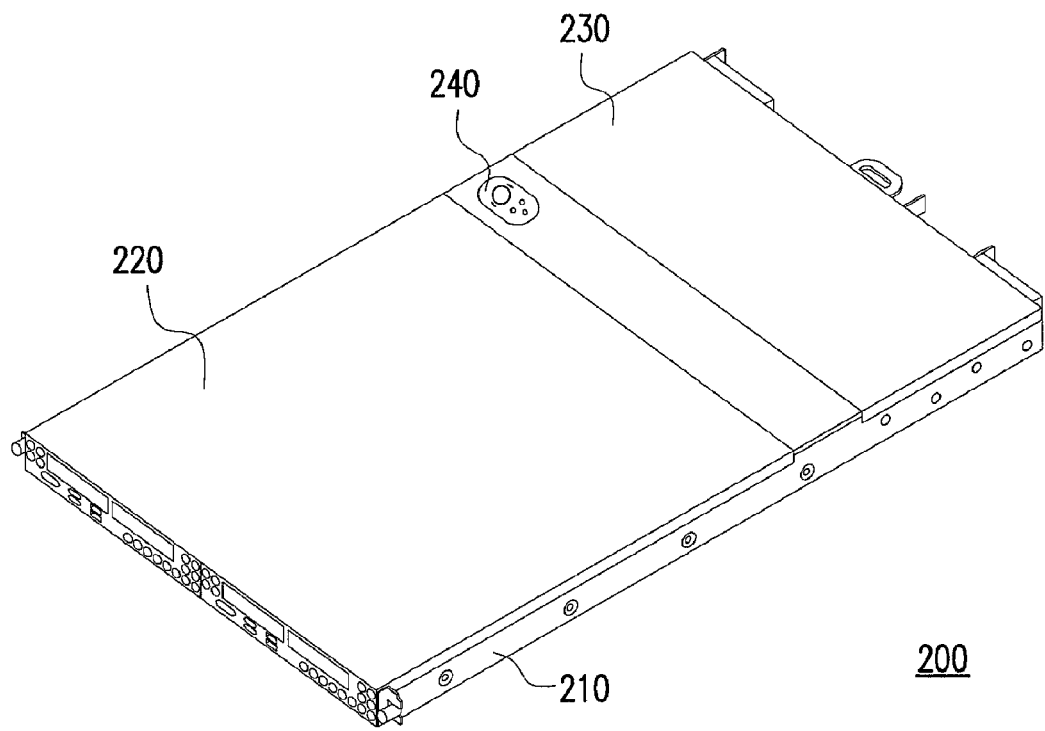
FIG. 3 is a three-dimensional diagram of the case of server in FIG. 2.
Figure 4:
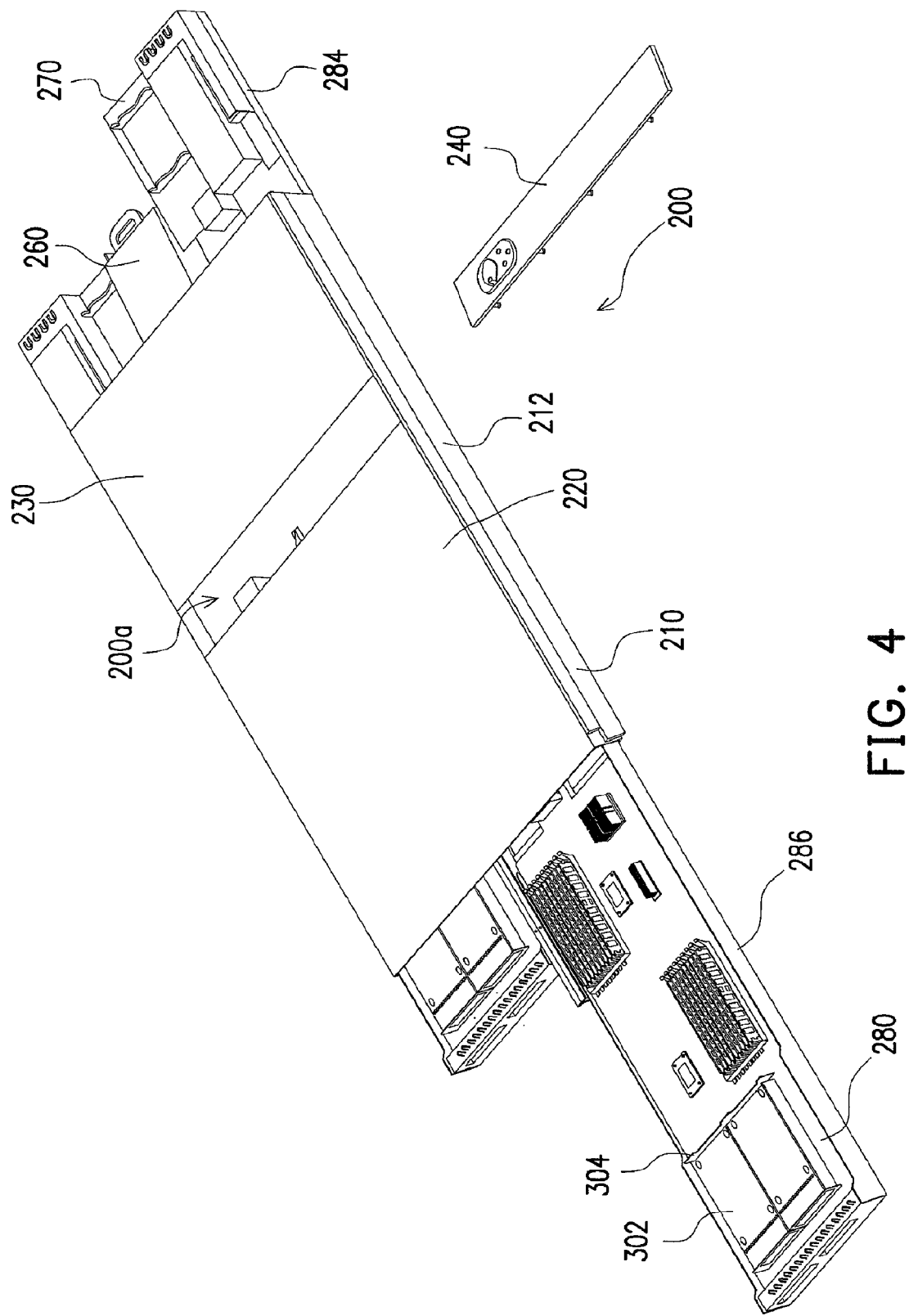
FIG. 4 is a diagram of the case of server of FIG. 2 where the third top cover is detached from the chassis thereof.

FIG. 2 is a top-view diagram of a case of server according to an embodiment of the present invention, FIG. 3 is a three-dimensional diagram of the case of server in FIG. 2 and FIG. 4 is a diagram of the case of server of FIG. 2 where the third top cover is detached from the chassis thereof. Referring to FIGS. 2, 3 and 4, a case of server 200 of this embodiment is applicable to a frame-type server. The case of server 200 includes a chassis 210, a first top cover 220, a second top cover 230 and a third top cover 240. The chassis 210 has a front side F, a back side B and a bottom plate 216 (shown in FIG. 7), wherein the bottom plate 216 has a fixing portion 216a (shown in FIG. 9). The first top cover 220 and the second top cover 230 are fixed on the chassis 210. The first top cover 220 and the second top cover 230 are respectively located at the both side of the chassis 210, and an opening 200a is disposed between the first top cover 220 and the second top cover 230. The third top cover 240 is located between the first top cover 220 and the second top cover 230 so as to cover the opening 100a, wherein the third top cover 240 is detachably assembled on the chassis 210.

Figure 9:
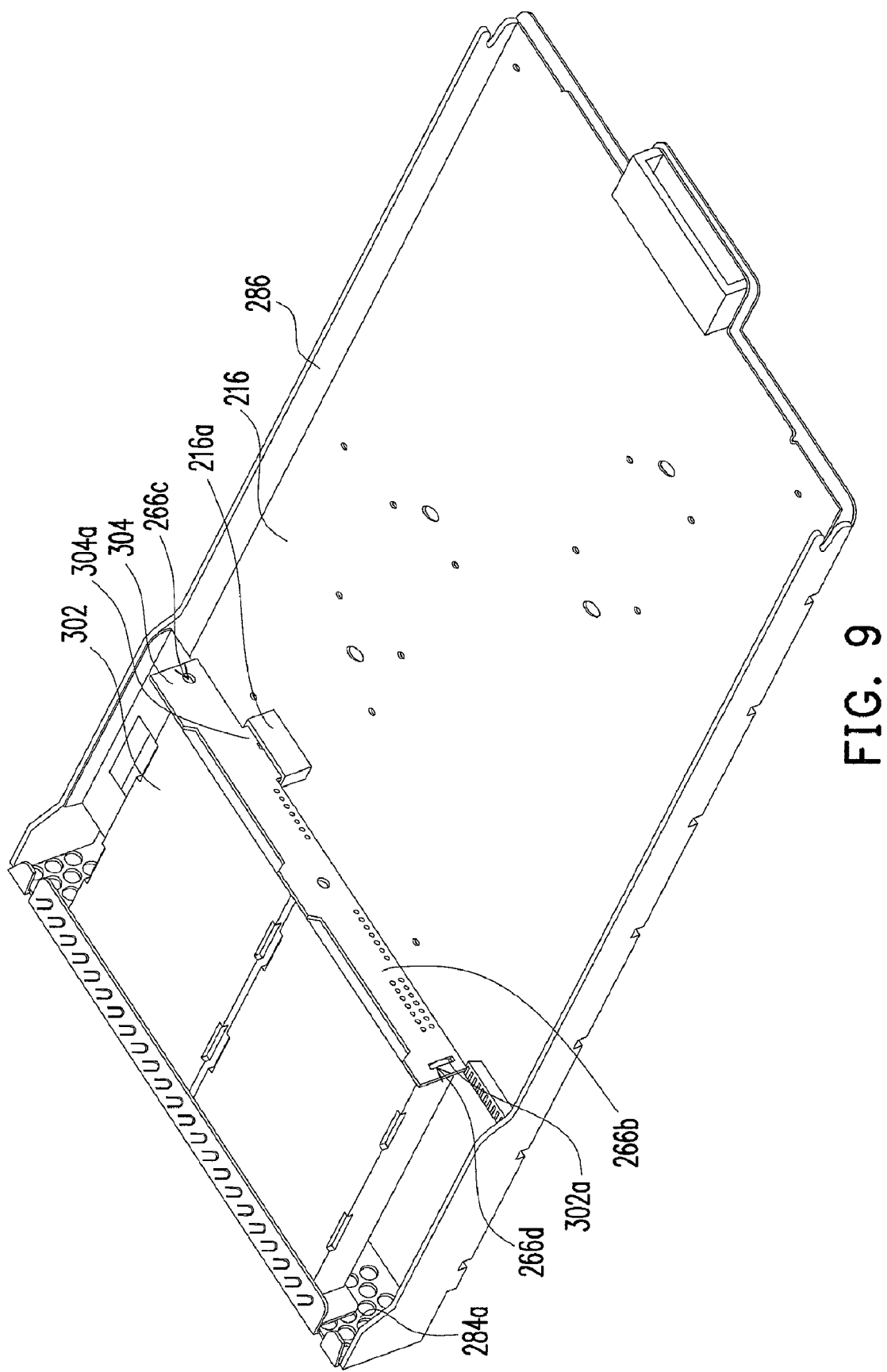
FIG. 9 is a diagram of a mother board and an HDD where the rear board of the HDD is inserted on the mother board.

In the embodiment, a plurality of electronic components are disposed in the case of server 200. For example, the case of server 200 further includes a power-supporting frame 262 fixed on the bottom plate 216. The power-supporting frame 262 forms an accommodating space for a power supply (not shown) to be disposed in the accommodating space. Besides, a power rear-board 264 can be inserted in the fixing portions 216a of the bottom plate 216 (shown in FIG. 9) of the chassis 210, and the power rear-board 264 is correspondingly located under the third top cover 240, wherein the power rear-board 264 is electrically connected between the mother board 280 and the power supply. The power rear-board 264 divides the chassis 210 into a first region 210a and a second region 210b, wherein the first tray 284 is located in the first region 210a and the second tray 286 is located in the second region 210b. Two input/output interface circuit boards 270 are disposed in the chassis 210 and respectively located at the both sides of the power-supporting frame 262 correspondingly under the second top cover 230, and the power rear-board 264 is located between the mother boards 280 and the input/output interface circuit boards 270. It should be noted that the position of the fixing portion 216a of the bottom plate 216 in FIG. 9 is schematically shown for indicating the power rear-board 264 can be inserted wherein, but does not limit the power rear-board 264 to be necessarily inserted in the fixing portion 216a located within the second region 210b. In fact, the position of the fixing portion 216a can be different depending on the requirement.

Two mother boards 280 are disposed in the chassis 210 and correspondingly located under the first top cover 220. The mother boards 280 are electrically connected to the power supply module 260, and the two input/output interface circuit boards 270 are respectively electrically connected to the corresponding one of the two mother boards 280. In more details, a plurality of connectors A are disposed on the mother boards 280, and the power supply is connected to the mother boards 280 through the connectors A so as to provide the mother boards 280 with electricity. Besides, a plurality of connectors B are disposed on the mother boards 280 too, and the input/output interface circuit boards 270 are connected to the mother boards 280 through the connectors B, so that the mother boards 280 can transmit signals to the input/output interface circuit boards 270. It should be noted that although the connectors A and B of the embodiment are disposed on the mother boards 280, but the connectors A and B of the embodiment can be disposed at other positions depending on the requirement. For example, the connectors A can be disposed on the power supply module 260 and the connectors B can be disposed on the input/output interface circuit boards 270 as long as the input/output interface circuit boards 270 and the power supply module 260 are electrically connected to the mother boards 280.

The electronic components inserted in the chassis 210 may be damaged and therefore need maintenance or replacement. The detachable design of the third top cover 240 in the embodiment enables a user to directly detach the third top cover 240 from the chassis 210, following by hot-swapping the defective electronic components without detaching the first top cover 220 and the second top cover 230, therefore the above-mentioned detachable design of the third top cover 240 brings convenience advantage. A structure design is exemplarily given as follows to explain how the third top cover 240 can be quickly detached from the chassis 210. It should be noted that the following example is for explanation, and not to limit the assembly way of the first top cover, the second top cover and the third top by the following example. In addition, anyone skilled in the art can modify the given structure or assembling way to achieve the same objective of the present invention without departing from the scope or spirit of the invention.

Figure 5:
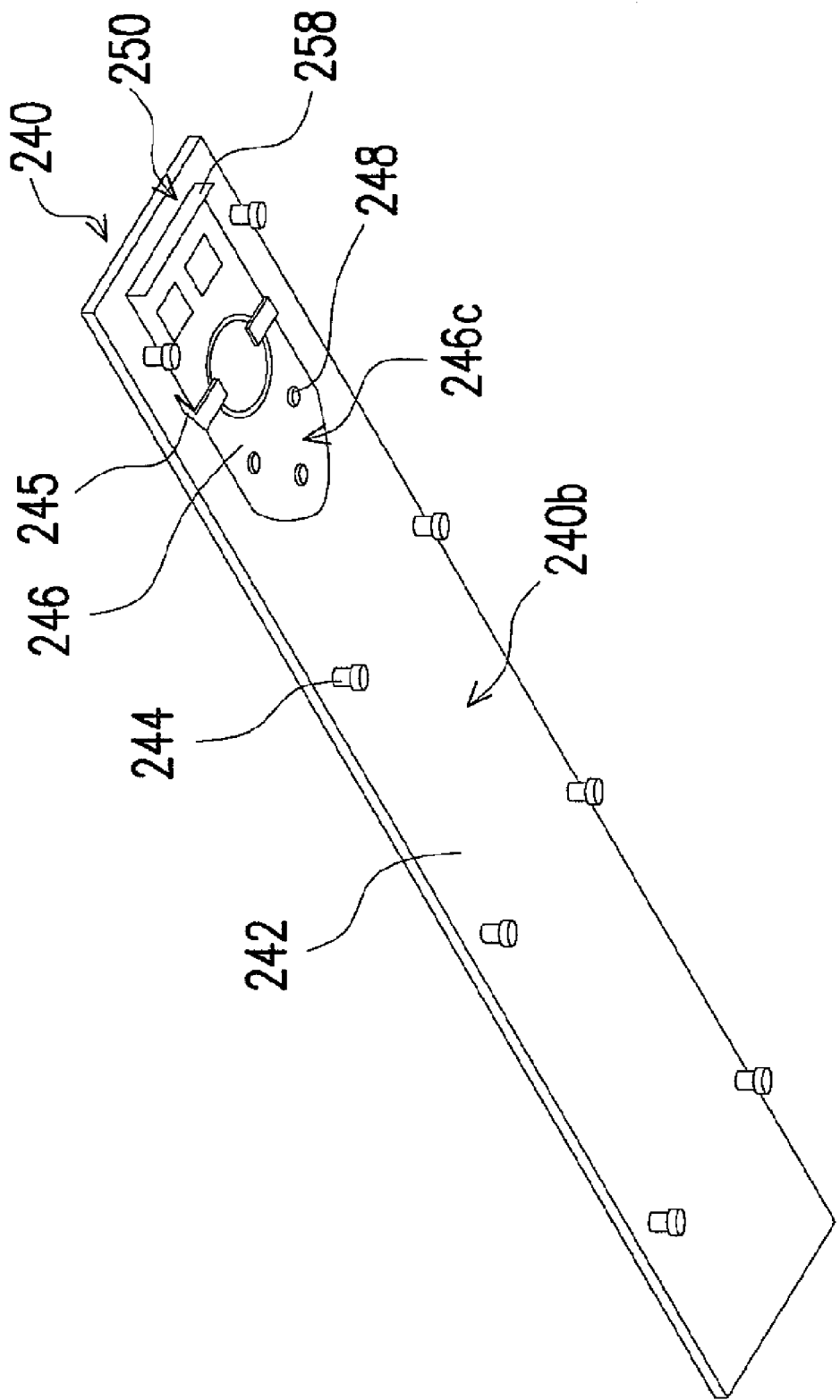
FIG. 5 is a diagram of a third top cover.
Figure 6:
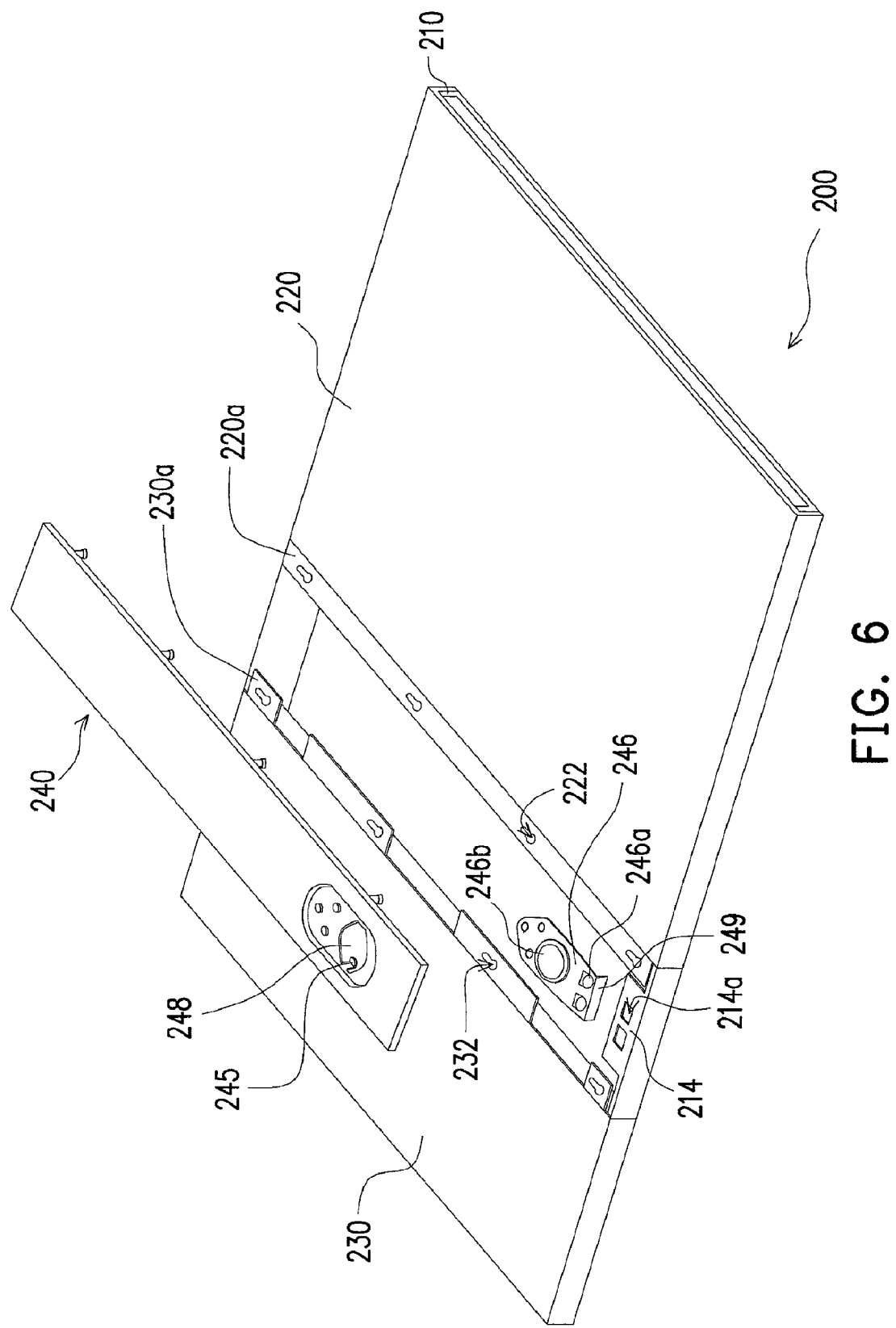
FIG. 6 is a diagram of the case of server where the third top cover is separated from both the second top cover and the first top cover.

FIG. 5 is a diagram of a third top cover. Referring to FIG. 5, the third top cover 240 includes a body 242 and a plurality of locking elements 244, wherein the locking elements 244 are arranged along the length direction of the body 242 at the both sides of the body 242, and the locking elements 244 can be I-shaped. FIG. 6 is a diagram of the case of server where the third top cover is detached from the chassis. Referring to FIG. 6, a plurality of positioning holes 222 and a plurality of positioning holes 232 are disposed on the chassis 210. The positioning holes 222 and 232 are calabash-figured holes, i.e., an side of the hole is circle-shaped and another side of the hole is a sliding slot with square or ellipse shape and connected to the circle, and the diameter of the circle is greater than the width (short axis) of the sliding slot. In the embodiment, the two adjacent side edges of the first top cover 220 and the second top cover 230 respectively have a first carrying folding 220a and a second carrying folding 230a, and the positioning holes 222 and 232 are respectively formed at the first carrying folding 220a and the second carrying folding 230a.

Referring to FIGS. 5 and 6, the positions of the positioning holes 222 can be placed correspondingly to or not correspondingly to the positioning holes 232, but the positioning holes 222 and the positioning holes 232 are respectively locked by the corresponding locking elements 244 located at the both sides of the body 242 of the third top cover 240. When the third top cover 240 is assembled with the chassis 210, each of the locking elements 244 is disposed and passes through the sliding slot of a corresponding one of the positioning holes 232 and 222. Referring to FIGS. 5 and 6, a side wall 212 of the chassis 210 has a folding 214 with two locking holes 214a. The third top cover 240 further includes a spring strip 246 with a positioning portion 248 and a hem 249, wherein an end having the positioning portion 248 of the spring strip 246 is fixed at a lower surface 246b of the third top cover 240, and the other end thereof can elastically move. The spring strip 246 has two locking tabs 246a which are correspondingly located in the locking holes 214a to be position-limited by the locking holes 214a; at the time, the third top cover 240 is fixed at the chassis 210. In addition, the third top cover 240 further has at least a hook 245 (two hooks are exemplarily shown in FIG. 5), and the hook 245 is suitable to lock the lower surface 246c of the spring strip 246 so as to fix the spring strip 246 at the lower side of the moveable third top cover 240. The hem 249 of the spring strip 246 leans against an inner side of a bottom side board connecting the folding 214, and the folding 214 of a chassis 210 is located between the spring strip 246 and the third top cover 240 to accomplish the assembling of the case of the server 200.

Continuing to FIGS. 5 and 6, when a user is going to detach the third top cover 240, the user presses a pressing portion 246b protruded from the third top cover 240 of the spring strip 246 to release the position-limiting between the locking tabs 246a of the spring strip 246 and the locking holes 214a, and then the user pushes the third top cover 240 so that the locking elements 244 of the third top cover 240 move along the sliding slots of the positioning holes 222 and 232 until arriving at the circles of the positioning holes 222 and 232. At the time, the position-limiting between the locking elements 244 and the positioning holes 222 and 232 are released and the third top cover 240 can be detached. It can be seen from the description above, there is no need to use a screwdriver to take away the screws for detaching the third top cover 240, which favors the user for operation convenience. Besides, there is no need to disassemble the first top cover 220 and the second top cover 230 from the chassis 210 for detaching the third top cover 240, which further makes the operation more convenient. The first top cover 220 and the second top cover 230 can be also fixed at the chassis 210 by using a rivet way, which contributes to enhance the overall strength of the case of server 200.

In addition, at least a sliding rail 212a is disposed on the two side walls 212 of the chassis 210, and the first tray 284 and the second tray 286 are slidingly joined with the sliding rail (not shown), so that the first tray 284 and the second tray 286 are slidingly disposed at the chassis 210 and can be drawn out from the chassis 210 to electronically disconnect the mother boards 280 from the power rear-board 264 or from the input/output interface circuit boards 270.

The case of server 200 further includes a plurality of central partition plates 282 which are disposed in the chassis 210, wherein the central partition plates 282 are located between two second trays 286 to separate them from each other.

Figure 7:
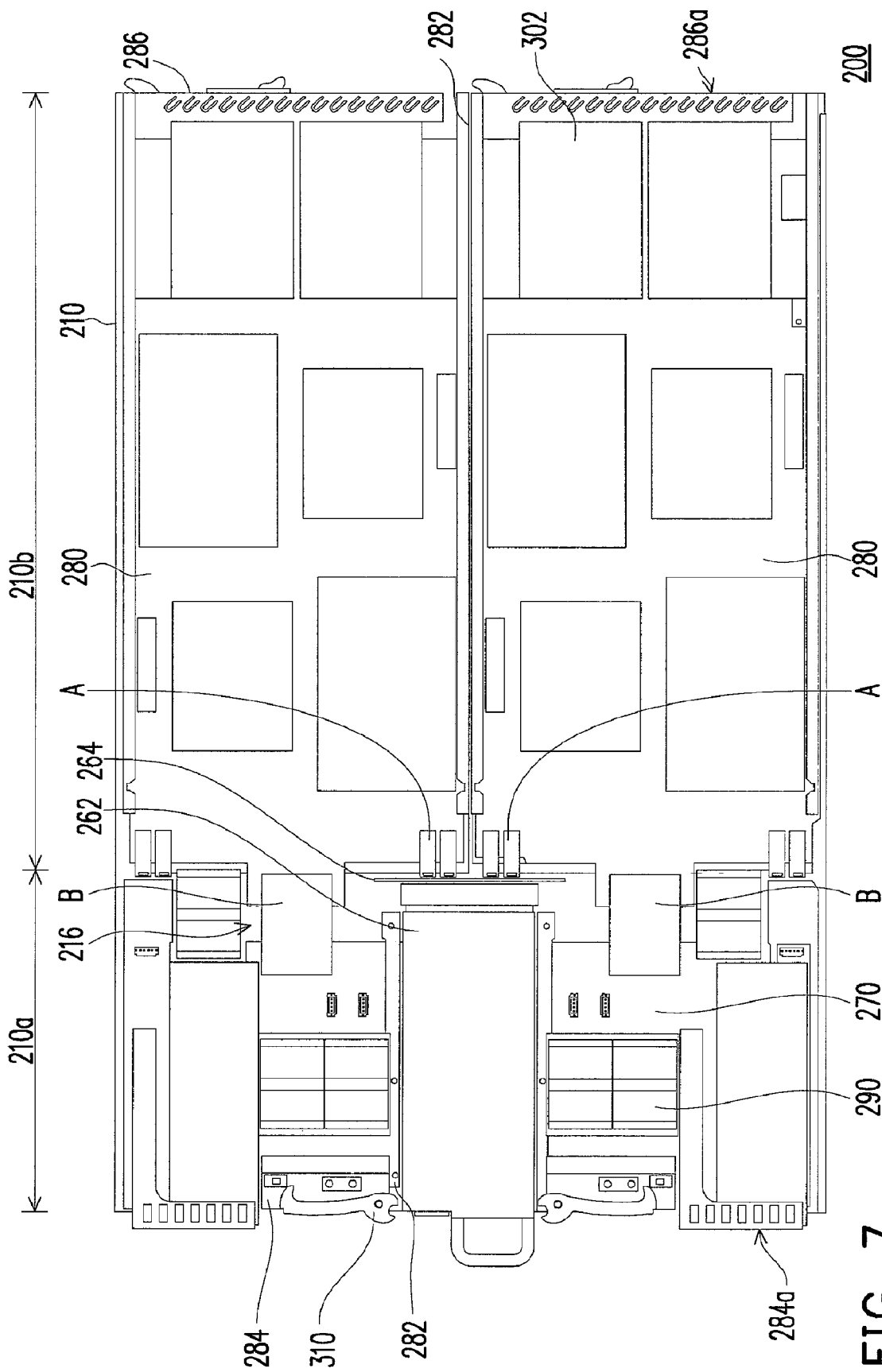
FIG. 7 is an architecture diagram of a server employing the case of server.
Figure 8:
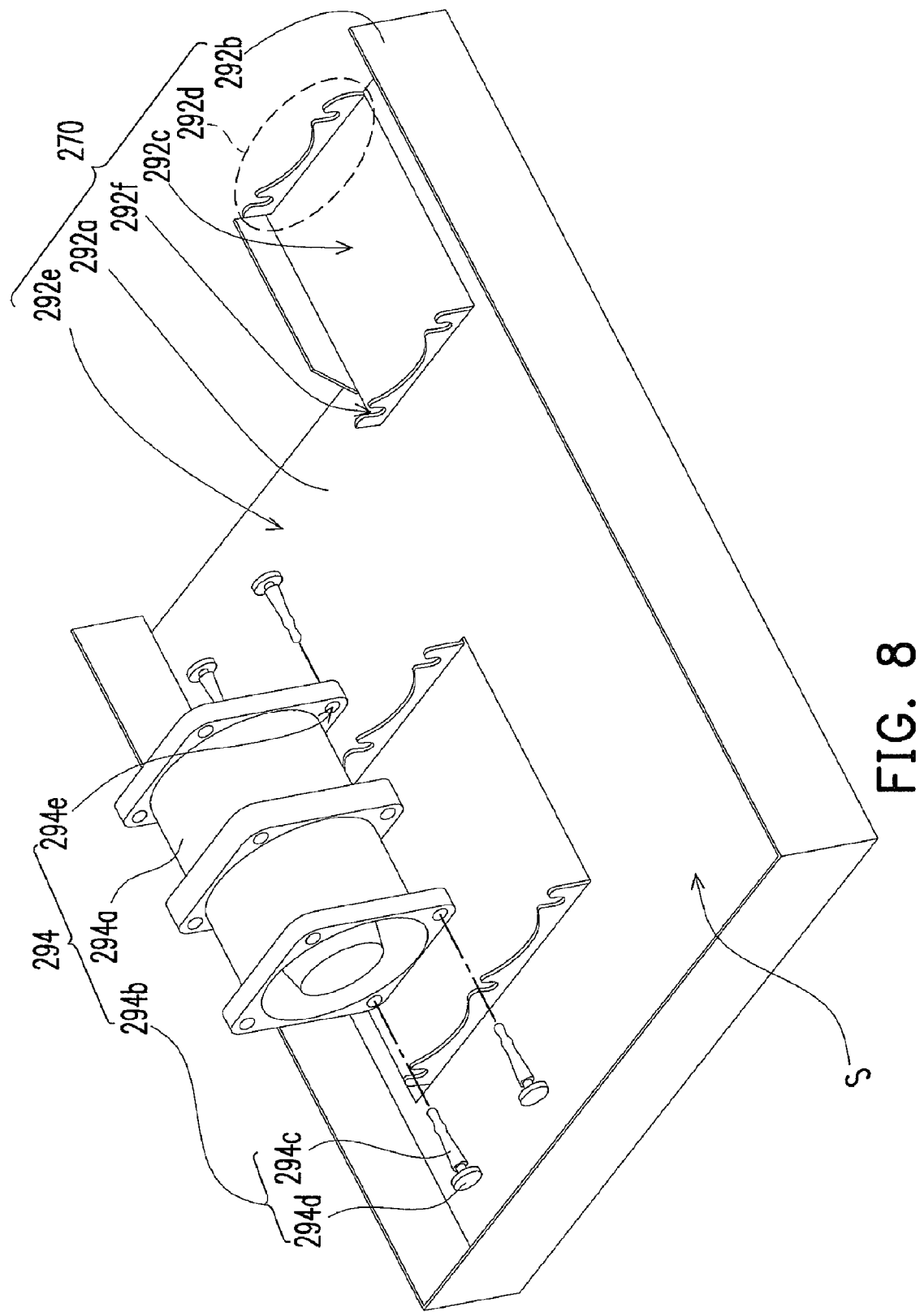
FIG. 8 is a diagram of a fan module installed in the server.

FIG. 7 is an architecture diagram of a server employing the case of server and FIG. 8 is a diagram of a fan module installed in the server. Referring to FIGS. 7 and 8, the case of the server 200 further includes a plurality of fan units 294 disposed on the first tray 284 above the input/output interface circuit boards 270, wherein the quantity of the fan units 294 depends on the demand. In more details, each of the first tray 284 has a bottom plate 292a, a plurality of frames 292b, a plurality of accommodating slots 292c and a plurality of supporting portions 292d opposite to each other. The bottom plate 292a has an upper surface 292e, and the bottom plate 292a and the frames 292b together define an accommodating space S for disposing the accommodating slots 292c and the supporting portions 292d therein. Specially, the supporting portions 292d are formed by bending parts of the bottom plate 292a towards the upper surface 292e, i.e., the supporting portions 292d and the bottom plate 292a are integrally formed. The supporting portions 292d respectively have a plurality of locking slots 292f, which are, for example, calabash-figured holes, and the locking slots 292f are respectively located at a side surface of each of the supporting portions 292d far away from the bottom plate 292a. The accommodating slot 292c is so large to be able accepting one or two fan units 294 disposed therein. Each of the input/output interface circuit boards 270 has openings (not shown) according to the position of the accommodating slot 292c to dispose the fan units 294.

Each of the fan units 294 has a fan cage 294a and a plurality of fan vibration resisting elements 294b connecting the fan cage 294a (only four fan vibration resisting elements 294b are exemplarily shown in FIG. 5). The fan motor (not shown) and the fan with blades are fixed in the fan unit 294 through the fan cage 294a, and the fan units 294 has, for example, a cuboid shape. The fan vibration resisting elements 294b are fixed at the lower side wall of the fan cage 294a and respectively lock a corresponding locking slot 292f, so that each of the fan cages 294a spans and fixed between any two supporting portions 292d opposite to each other. In the embodiment, the fan vibration resisting elements 294b are respectively composed of a rod body 294c and a flange 294d protruded out of the rod body 294c, and the assembly of the above-mentioned parts looks like a bolt and can be integrally formed, wherein the material of the fan vibration resisting elements 294b is, for example, rubber or silicon adhesive. Besides, the lower-edge corners of the lower side wall of the fan cage 294a have four through holes 294e in total, and the through holes 294e are respectively and paired corresponding to each of the locking slots 292f. It should be noted that, in the embodiment, the fan vibration resisting elements 294b are suitable to absorb shock produced by the self-vibration of the fan units 294 so as to avoid the noise caused by the shock.

FIG. 9 is a diagram of a mother board and an HDD where the rear board of the HDD is inserted on the mother board. Referring to FIGS. 4 and 9, a case of the server 200 further includes s hard disk drive bracket 302, wherein the bracket hard disk drive bracket 302 is disposed at the second tray 286 and fixed on the mother board 280, the hard disk drive bracket 302 has a plurality of fixing portions 302a disposed at a side of the expansion slot 216a of the hard disk drive bracket 302 adjacent to the bottom plate 216. The HDD (not shown) is disposed in the hard disk drive bracket 302. A hard disk rear board 304 includes a first connection portion 304a, a plurality of second connection portions 304b and a plurality of fixing and connecting portions 304c and 304d, wherein the first connection portion 304a is connected to a golden finger interface of the locking slots 216a, the second connection portions 304b are connected to the corresponding one of the HDDs (not shown), and the fixing and connecting portions 304c and 304d are fixed to the fixing portion 302a so as to fix and connect the hard disk rear board 304 at a side of the hard disk drive bracket 302.

Continuing to FIGS. 4 and 9, a first bending portion 284a is disposed at a side of the first tray 284 far away from the second tray 286, a second bending portion 286a is disposed at a side of the second tray 286 far away from the first tray 284, and the first bending portion 284a and the second bending portion 286a respectively form a rear window and a front window. The front window and the rear window are used to prevent foreign matter to enter into the case of the server 200.

FIG. 10 is a diagram of the locking structures in the case of server, wherein the locking structures are installed at the bottom portion of the first tray in the case of server. Referring to FIG. 4, the case of server 200 further includes a plurality of locking structures 310. The locking structures 310 are disposed, for example, at a surface of the bottom of the first tray 284 or the second tray 286 (in FIG. 10, the locking structures 310 are disposed at the bottom of the first tray 284) so that the first tray 284 and the second tray 286 are fixed in the chassis 210. Preferably, the locking structures 310 are respectively located at a side of the first tray 284 far away from the second tray 286 or disposed at a side of the second tray 286 far away from the first tray 284. In more details, the chassis 210 has a positioning portion 324, and each of the locking structures 310 includes a handgrip 312, an elastic element 314 and a retaining element 316. The handgrip 312 has a pivoting shaft 312a, a positioning element 312b, a first end S1 and a second end S2 opposite to the first end S1. The pivoting shaft 312a is located at the first end S1 and suitable to connect the first tray 284 or the second tray 286, so that the handgrip 312 is suitable to swing on the surface of the bottom portion of the first tray 284 or the second tray 286. The positioning element 312b is disposed at the first end S1 and suitable to interfere with the positioning portion 324 so as to fix the first tray 284 or the second tray 286 at the chassis 210. The elastic element 314 has a first fixing portion 314a and a leaning portion 314b, the first fixing portion 314a is connected to and fixed at the first tray 284, and the leaning portion 314b is connected to the first fixing portion 314a and pushes the handgrip 312. The retaining element 316 has a second fixing portion 316a and a retaining portion 316b, the second fixing portion 316a is connected to and fixed at the first tray 284, and the retaining portion 316b is connected to the second fixing portion 316a and locks the second end S2. When the retaining element 316 locks the handgrip 312, the handgrip 312 is located at an initial position; when the retaining portion 316b and the handgrip 312 are free from interference, the elastic force of the leaning portion 314b is exerted on the handgrip 312 so as to make the handgrip 312 depart from the initial position; when the handgrip 312 after departing from the initial position pushes the retaining portion 316b, the leaning portion 314b locks the handgrip 312 to fix the handgrip at the initial position.

In summary, the case of server of the present invention has at least following advantages:

1. The first top cover, the second top cover and the chassis are fixed together, which can enhance the strength of the case of server. In addition, the third top cover can be disassembled from the first top cover and the second top cover without detaching the first top cover and the second top cover.
2. By disposing the spring strip, the locking tabs and the locking elements on the third top cover in association with the locking holes at the side wall of the chassis and the calabash-figured holes of the first top cover and the second top cover, the user can conveniently detach down the third top cover by pressing and pushing operations without a screwdriver to loosen screws, which brings the user convenience.
3. By disposing the carrying trays and the sliding rails, the mother board and the input/output circuit boards can be hot-swappable, which makes the user conveniently maintain and replace.

It will be apparent to those skilled in the art that various modifications and variations can be made to the structure of the present invention without departing from the scope or spirit of the invention. In view of the foregoing, it is intended that the present invention covers modifications and variations of this invention provided they fall within the scope of the following claims and their equivalents.

What is claimed is:

1. A case of server, suitable to accommodate a plurality of electronic components in the case, and the case of server comprising:

a chassis, having a front side, a back side and a bottom plate, wherein the bottom plate has a fixing portion;

a first top cover, fixed on the chassis;

a second top cover, fixed on the chassis, wherein the first top cover and the second top cover are respectively located at the front side and the back side of the chassis, and an opening is disposed between the first top cover and the second top cover;

at least a first tray, slidingly disposed at the chassis, wherein when the first tray is located in the chassis, the first tray is correspondingly located under the second top cover;

at least a second tray, slidingly disposed at the chassis, wherein when the second tray is located in the chassis, the second tray is correspondingly located under the first top cover;

at least an input/output circuit board, disposed on the first tray;

at least a mother board, disposed on the second tray; and a third top cover, located between the first top cover and the second top cover for covering the opening, wherein the third top cover is detachedly assembled with the chassis, and when the third top cover is disassembled from the chassis, the fixing portion is exposed by the opening.

2. The case of server as claimed in claim 1, further comprising a power-supporting frame fixed on the bottom plate of the chassis and correspondingly located under the second top cover, wherein the power-supporting frame forms an accommodating space for placing a power supply.

3. The case of server as claimed in claim 2, further comprising a plurality of central partition plates disposed in the chassis, wherein many of the central partition plates are for separating the first trays from each other, rest of the central partition plates are disposed between the second trays and the power-supporting frame, and each of the central partition plates has a plurality of sliding rails thereby the first trays and the second trays are slidingly disposed in the chassis.

4. The case of server as claimed in claim 1, wherein the third top cover has a plurality of locking elements correspondingly locked with a plurality of positioning holes of the chassis.

5. The case of server as claimed in claim 4, wherein the two adjacent side edges of the first top cover and the second top cover respectively have a first carrying folding and a second carrying folding, and the positioning holes are respectively formed on the first carrying folding and the second carrying folding.

6. The case of server as claimed in claim 4, wherein the figures of the locking elements are I-shaped and the positioning holes are calabash-figured holes.

7. The case of server as claimed in claim 1, further comprising a spring strip having two ends, wherein an end of the spring strip is fixed at the lower surface of the third top cover while another end is elastically moveable, the spring strip has at least a locking tab, when the locking elements of the third top cover lock the positioning holes, the locking tab of the spring strip locks a locking hole of the chassis to make the third top cover fixed on the chassis.

8. The case of server as claimed in claim 7, wherein the spring strip further has a pressing portion protruded out of a positioning portion of the third top cover, and a force is exerted to the pressing portion so as to release the position-limiting of the third top cover from the chassis.

9. The case of server as claimed in claim 8, wherein the third top cover further has at least a hook, and when the pressing portion of the spring strip protruded out of the upper surface of the third top cover is pressed, the hook locks an lower surface of the spring strip.

10. The case of server as claimed in claim 7, wherein the spring strip further has a hem, and when the locking tab of the spring strip locks the locking hole at a folding of the chassis, the hem suits to lean against the inner side of the case under the folding of the chassis.

11. The case of server as claimed in claim 1, further comprising a hard disk drive bracket carried by the second tray and fixed on the mother board to accommodate at least a hard disk drive.

12. The case of server as claimed in claim 1, wherein each of the first trays further has a plurality of supporting portions opposite to each other for accommodating at least a fan unit so that each of the fan units spans and being fixed between any two supporting portions opposite to each other.

13. The case of server as claimed in claim 12, wherein the supporting portions respectively have a plurality of locking slots, each of the fan units has a fan cage and a plurality of fan vibration resisting elements connecting the fan cage, the fan vibration resisting elements are fixed at the lower side wall of the fan cage and respectively lock the corresponding locking slots.

14. The case of server as claimed in claim 1, further comprising a plurality of locking structures suitable to be disposed at a surface of the first tray and the second tray, wherein the locking structures are respectively disposed at two sides of the first tray and the second tray away from each other, the chassis has a positioning portion and each of the locking structure comprises:

a handgrip, pivoted on the above-mentioned surface of the first tray or the second tray;

an elastic element, connected to and fixed at the first tray or the second tray and urged against the handgrip; and a retaining element, connected to and fixed at the first tray or the second tray, and when the retaining element is locked the handgrip, the handgrip is located at an initial position, wherein when the retaining element and the handgrip are free from interference, an elastic force of the elastic element is exerted on the handgrip so as to move the handgrip away from the initial position;

when the handgrip away from the initial position urges the elastic element, the retaining element thereby locks the handgrip to fix the handgrip at the initial position.

15. The case of server as claimed in claim 14, wherein the handgrip has a pivoting shaft, a positioning element, a first end and a second end opposite to the first end, the pivoting shaft is located at the first end and suitable to connect the first tray or the second tray, so that the handgrip is suitable to swing on the surface by means of the pivoting shaft, the positioning element is disposed at the second end and suitable to interfere with the positioning portion so as to fix the first tray or the second tray at the chassis.

16. The case of server as claimed in claim 14, wherein the elastic element has a first fixing portion and a leaning portion, the first fixing portion is connected to and fixed at the first tray or the second tray, and the leaning portion is connected to the first fixing portion and to push up the handgrip.

17. The case of server as claimed in claim 15, wherein the retaining element has a second fixing portion and a retaining portion, the second fixing portion is connected to and fixed at the first tray or the second tray, and the retaining portion is connected to the second fixing portion and locks the second end of the handgrip.

18. The case of server as claimed in claim 1, wherein a side of the first tray far away from the second tray has a first bending portion, a side of the second tray far away from the first tray has a second bending portion, and the first bending portion and the second bending portion respectively form a rear window and a front window of the chassis.

* * * * *